Dec. 16, 1947.                R. M. WEBSTER                2,432,639
                      DIELECTRIC WELDING ROD HOLDER
              Filed April 14, 1944           2 Sheets-Sheet 2
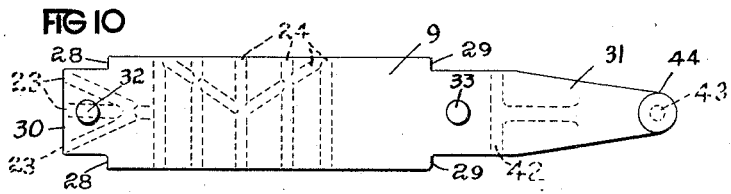
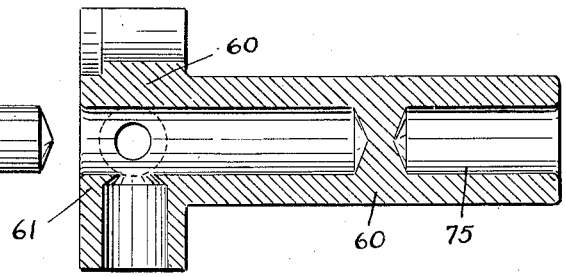
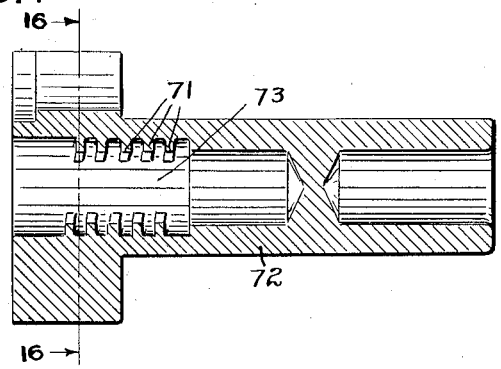
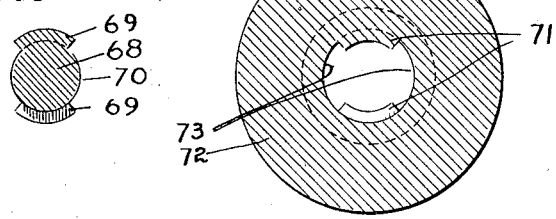
INVENTOR.
ROGER M. WEBSTER.
BY Paul A. Talbot.
ATTORNEY.

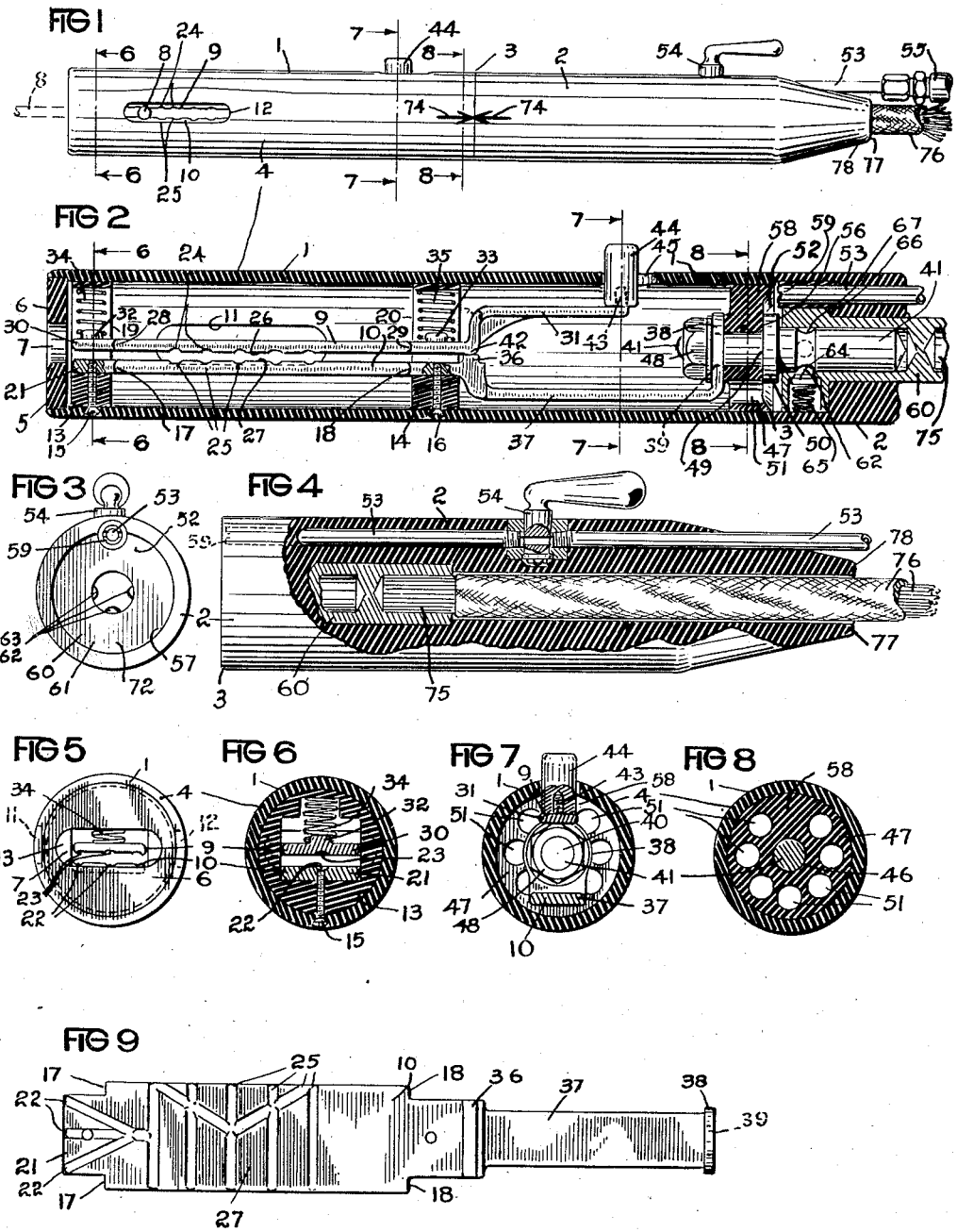

Patented Dec. 16, 1947

2,432,639

UNITED STATES PATENT OFFICE 2,432,639

DIELECTRIC WELDING ROD HOLDER

Roger M. Webster, New London, Conn.

Application April 14, 1944, Serial No. 530,965

9 Claims. (Cl. 219—8)

My invention relates to a welding rod holder and particularly to a welding rod holder electrically insulated and cooled and with maximum contact areas. Among the purposes and objects are to provide:

A safe dielectric welding rod holder.

A welding rod holder having large contact surfaces and air flow to cool and blow fumes and smoke away from the work and operator.

A simple and easily separated two part holder separating the electric connection from the rod holder.

An air flow system cooling the spattering flying flux and preventing the flux from sealing the electrode parts.

A holder which conditions the air at and around the operator and work, reducing fire hazard and increasing safety and health.

An electrode and welding rod holding means preventing arcing and heating.

A quick and positive grip and release for the welding rod.

A welding rod holder having an air flow along the rod and around all contact parts.

A welding rod holder having few parts and easily accessible and robust.

A safe, economical electric welding rod holder.

I accomplish these and other objects by the construction herein described and shown in the drawings forming a part hereof, in which:

Fig. 1 is a side elevation of my electric welding rod holder.

Fig. 2 is a longitudinal section along the axial center of the electrodes and rod holding end.

Fig. 3 is a front end elevation of the connector end.

Fig. 4 is a side elevation and partial longitudinal section of the connector end.

Fig. 5 is a front end elevation of the holder end.

Fig. 6 is a transverse section at 6—6, Fig. 2.

Fig. 7 is a transverse section at 7—7, Figs. 1 and 2.

Fig. 8 is a transverse section at 8—8, Fig. 2.

Fig. 9 is a plan view of the fixed electrode.

Fig. 10 is a plan view of the movable electrode.

Fig. 11 is a detail of the male connector.

Fig. 12 is a longitudinal section of the female connector.

Fig. 13 is a detail of a modified male connector.

Fig. 14 is a longitudinal section of a modified female connector.

Fig. 15 is a transverse section at 15—15, Fig. 13.

Fig. 16 is a transverse section at 16—16, Fig. 14.

Similar reference characters refer to similar parts throughout the several views of the drawing and in the specification to follow.

General description

It is my purpose in this disclosure of a preferred construction embodying my invention and its underlying principles, to describe the various parts in precise detail so that the construction may be more readily understood and studied by those skilled in the art to which my invention pertains rather than to attempt to show numerous modifications and equivalent structure. This disclosure is intended to illustrate, rather than to limit and restrict the scope of my invention.

It may be obvious after a study of this disclosure that modifications may be made to suit and adapt my device to the various uses and work to which my invention may be applied.

In electric welding rod holders, a common difficulty is that the parts become overheated due to the difficulty of providing sufficient contact areas to carry the high amperage used. Arcs and welding at the connections are frequent. Shields and baffles are frequently provided to provide safety against flying, spattering flux and molten metal; all of these devices are clumsy and in the way. These and other common difficulties are eliminated by the improvements resulting from the construction herein specified and shown in detail, which permits large parts to be assembled in the necessarily restricted space available in a welding rod holder.

The complete flow of air past the various parts and the simple change of high pressure air to expanded cold low pressure air is accomplished in the holder without impairing the utility and compactness of my device. The air flow accomplishes a better diversion of sparks, flux, and flying metal than is possible with a shield and yet without being in the way or interfering with the work.

The user is provided with air which is cooled and changed, blowing away all fumes and gases, all of which increases health and efficiency and increases productivity.

The holder is more compact for the character of work performed and may be made in several sizes to suit the lightest and also the heaviest welding.

The experienced welder will appreciate these and other advantages after a study and understanding of the construction set forth in the following specifications.

Detailed specifications

Referring to the drawings, my welding rod holder or handle is shown in two easily separated parts; the holder 1 and the connector 2, separable at 3.

The holder 1 comprises a tubular housing 4 of electric insulating material such as fiber, plastic, or other suitable material. The end 5 of the housing is partially closed by the insulating end wall 6 which is provided with the opening 7 through which the welding rod 8 may be inserted to be gripped by the electrodes 9 and 10 which also may grip and hold the rod 8 when inserted in the side openings 11 and/or 12 in the housing 4.

The electrode 9 is movable in relation to the various parts and to the electrode 10 which is fixed and detachably secured to the housing 4 and the front guide 13 and rear guide 14 by the screws or other securing means 15 and 16 and also due to its shape in which I have provided the front shoulders 17 and rear shoulders 18 to engage the end faces 19 and 20 of the guides 13 and 14.

Extending beyond the shoulders 17 and passing through the front guide 13, I have provided the front extension 21, which is grooved at 22 to engage and hold the welding rod in any one of several positions and angles and to cooperate with the conforming grooves 23 of the electrode 9 which also is provided with the grooves 24 conforming in their disposition to the grooves 25 in the electrode 10. The various grooves in the two electrodes in their gripping faces 26 and 27 provide a means of preventing the welding rod, regardless of the size used, from slipping or shifting position and are disposed to give the maximum variation of positions to the rod when it is held through the openings in the housing or end wall.

The electrode 9 is freely and movably held and guided in its movement by the front shoulders 28 and rear shoulders 29 and the front extension 30 which passes through the front guide 13 as well as the rear extension 31 which passes through the rear guide 14. The electrodes 9 and 10 are substantially the same in shape and size at and between the guides except that the electrode 10 is held and the electrode 9 is free to move in the guides.

On the face opposite the grooves, the electrode 9 is provided with the spring seat bosses 32 and 33 which engage and hold in place, in the guides, the springs 34 and 35.

The electrode 10 is preferably provided with a fulcrum table 36 disposed near and back of the guide 14 on the rear extension 37 which continues toward the rear to the connector boss 38 which is apertured at 39 to receive the threaded end 40 of the male connector 41.

The electrode 9 is provided with the fulcrum 42 at and near the guide 14 on the rear extension 31 which continues rearwardly to the button boss 43 which is threaded to detachably secure the button 44.

The button 44 extends outwardly through the opening 45 in the housing 4 and when pressed overcomes the springs 34 and 35 to separate the electrodes 9 and 10 permitting the insertion or release of the welding rod. The rear extension of the electrode 9 provides a lever to tilt the electrode on its fulcrum.

When the welding rod is inserted between the electrodes and pressure is released on the button, the fulcrum 42 is raised from the fulcrum table 36 permitting the electrodes to automatically assume parallel relationship with each other and thus apply equal pressure on the electrode 9 by each of the springs 32 and 33 and equal pressure on the welding rod throughout its contact within the grooves of the two electrodes. By means of the parallel large contact area provided by my electrodes in relation to the welding rod, arcing and heating, are substantially overcome, yet the welding rod is firmly gripped and held in the grooves of the two electrodes by the pressure provided by the springs.

The electrodes 9 and 10, while gripping the welding rod, due to the compression of the springs, are held substantially parallel to each other and also to the welding rod and the electrodes are tilted or swung out of parallel relationship only when the welding rod is released from the grip of the electrodes.

It will be seen that joints, pins, and uneven gripping are eliminated by the fulcrum and tilting device provided as a means of gripping and releasing the welding rod and that as the fulcrum is movable away from its table, even contact is provided.

The male contact 41 passes through the center bore 46 of the distributor 47 which is clamped between the nut 48 and shoulder 49 of the collar 50 on the male connector which is disposed at the end of the housing 4 at the point of separation between the holder 1 and connector 2.

The distributor 47 is provided with a plurality of air ducts 51 disposed around the male connector and provides expanded air from the chamber 52 to the interior of the housing 4 through which the air flows past the electrodes and out of the housing through the openings 7, 11, and 12 and along the welding rod. The flow of air out of the end and sides of my holder dispenses gases, fumes, and heat as well as cools the holder and the air around the work and operator.

The chamber 52 is provided with air from the duct 53 which passes through the connector 2 and through the high pressure regulating valve 54 and out the rear of the connector to the hose coupling 55 to which compressed air means may be attached in the usual way when supplied to air operated tools.

The chamber is formed by a recess in the end face 56 of the distributor 47 and also by the recessed end 57 of the connector. The distributor is preferably provided with the baffle 58 opposite the open end 59 of the duct 53.

The male connector 41 extends rearwardly beyond the collar 50 and engages the female connector 60 which is secured within the connector 2 and is enlarged at the front end 61 to receive the spring detents 62 comprising a spherical end 63 and the spring seats 64 which receive one end of the springs 65; the other end pressing and seated against the inner surface of the counterbore 66 of the connector 2 which is of sufficient depth to provide a part of the chamber 52 formed between the holder 1 and connector 2, the ends of which abut at and are snugly drawn together at 3 by the male and female connectors and by the detents 62, the spherical ends 63 of which engage the annular groove 67 in the male connector 41.

In Figs. 13 and 14 of the drawings, I have shown a modification of the male and female connector in which the detents and groove is replaced by threads to draw and secure the parts together; in other respects the modified male and female connectors are the same as 41 and 60.

The modified male connector 68 is provided with threads 69 which are cut away at opposite sides 70 to receive the internal threads 71 of the female connector 72, the threads of which are also cut away at 73 to receive the threads 69; the cut out portion of both threads permitting free axial travel of the connectors until turned at 90 degrees causing the thread to become engaged and to draw the connectors and parts secured to them together in much the same manner as the breach block in large guns.

Indicia, or other means, 74 is provided on the exterior of the holder 1 and connector 2 to determine the proper position of these parts when united.

The final connector 69 or 72 is provided with a cable socket 75 into which the electric cable 76 may be soldered or otherwise secured to provide electric current through the several parts above described within the connector and holder to the welding rod. The cable passes rearwardly through the hollow center 77 and out of the rear end 78 of the connector 2 to the source of electric power.

Having thus described and shown a preferred construction illustrating an embodiment of my invention, what I claim as new and desire to secure by Letters Patent is set forth in the following claims:

I claim:

1. In an electric welding device and welding rod holder, a separable handle having means in one of its parts for holding said welding rod and in the other part a connector and electric cable secured thereto to supply electric current to said welding rod and to detachably connect said holding part to said connector part, means supplying compressed air to said connector part and expanded air through said holder part, said holder part having a housing and openings for inserting the welding rod and to discharge expanded air through said openings and around the welding rod.

2. In a handle for electric welding having a pair of separable parts, one of said parts having welding rod holding means and the other of said parts having an electric cable and compressed air cooling means for supplying current to the welding rod holding means and air to cool the welding rod, means detachably securing one part of the handle to the other and means expanding and delivering expanded air to and around said welding rod.

3. In a handle for electric welding having a pair of separable parts, one of said parts having welding rod holding means and the other of said parts having an electric cable supplying current to the welding rod holding means and air to cool the welding rod, means detachably securing one part of the handle to the other and means expanding and delivering expanded air to and around said welding rod, said compressed air means being disconnected simultaneously from said rod holding means by separating the parts of said handle.

4. In a handle for electric welding having a pair of separable parts, one of said parts having welding rod holding means and the other of said parts having an electric cable supplying current to the welding rod holding means and air to cool the welding rod, means detachably securing one part of the handle to the other and means expanding and delivering expanded air to and around said welding rod, said handle being separable at the means expanding the air.

5. In a handle for electric welding having a pair of separable parts, one of said parts having welding rod holding means and the other of said parts having an electric cable supplying current to the welding rod holding means and air to cool the welding rod, means detachably securing one part of the handle to the other and means expanding and delivering expanded air to and around said welding rod, said connector means having air regulating means whereby expanded air is disconnected at and between the holder part and connector part of said handle whereby air at relatively low pressure is provided at the joint between the parts of the handle.

6. In a handle for electric welding having a pair of separable parts, one of said parts having welding rod holding means and the other of said parts having an electric cable supplying current to the welding rod holding means and air to cool the welding rod, means detachably securing one part of the handle to the other and means expanding and delivering expanded air to and around said welding rod, an air chamber and air distributing means being provided at and between the holder part and the connector part whereby air at relatively low pressure is delivered at the point of separation between the two parts of the handle.

7. In a handle for holding welding rods, a pair of electrodes and spring means pressing and gripping the welding rod between said electrodes, one of said electrodes being held in fixed position in said handle and means connecting an electric cable for supplying electric current to said electrode and the other electrode being movable in relation to said fixed electrode, both of said electrodes being longitudinally disposed in said handle, and fulcrum means between said electrodes and between the ends of and to tilt the movable electrode, said spring pressing means comprising a plurality of springs in which one of said springs is disposed relatively close to said fulcrum means and compressed less when said movable electrode is tilted on said fulcrum and another spring being disposed substantially at the free end of said movable electrode, said spring being compressed when said welding rod is gripped between said electrodes and between the springs near the fulcrum and at the free end thereof.

8. In a handle for holding welding rods, a pair of electrodes and spring means pressing and gripping the welding rod between said electrodes, one of said electrodes being held in fixed position in said handle and means connecting an electric cable for supplying electric current to said electrode and the other electrode being movable in relation to said fixed electrode, both of said electrodes being longitudinally disposed in said handle, and fulcrum means between said electrodes and between the ends of and to tilt the movable electrode, said spring pressing means comprising a plurality of springs in which one of said springs is disposed relatively close to said fulcrum means and compressed less when said movable electrode is tilted on said fulcrum and another spring being disposed substantially at the free end of said movable electrode, said spring being compressed when said welding rod is gripped between said electrodes and between the springs near the fulcrum and at the free end thereof, and a push button and lever extension at the opposite end to tilt said movable electrode on its fulcrum to release said welding rod.

9. In a handle for holding welding rods, a pair of electrodes and spring means pressing and gripping the welding rod between said electrodes and means tilting one of said electrodes in relation to the other to release said welding rod from between said electrodes, said tilting means comprising a fulcrum separable from its table when said tilting means is released and said movable electrode becomes substantially parallel to said fixed electrode, said electrodes being spaced apart less than the thickness of the welding rod, thereby causing the welding rod to overcome the spring pressing means and to raise said fulcrum from its table.

ROGER M. WEBSTER.

REFERENCES CITED

The following references are of record in the file of this patent:

UNITED STATES PATENTS

| Number | Name | Date |
|---|---|---|
| 1,462,620 | Peeler | July 24, 1923 |
| 1,551,729 | Burns | Sept. 1, 1925 |
| 1,677,306 | Stancliff | July 17, 1928 |
| 1,726,624 | Lawson | Sept. 3, 1929 |
| 1,729,059 | Bicsey | Sept. 24, 1929 |
| 1,754,353 | Endebak | Apr. 15, 1930 |
| 1,811,156 | Sadler | June 23, 1931 |
| 1,850,293 | Stoody (1) | Mar. 22, 1932 |
| 1,876,786 | Stoody (2) | Sept. 13, 1932 |
| 1,927,135 | Sammons | Sept. 19, 1933 |
| 2,080,791 | Sanders | May 18, 1937 |
| 2,179,440 | Wagner (1) | Nov. 7, 1939 |
| 2,304,321 | Wagner (2) | Dec. 8, 1942 |
| 2,336,712 | Bourgue | Dec. 14, 1943 |
| 2,336,732 | Howard | Dec. 14, 1943 |
| 2,338,000 | Landis | Dec. 28, 1943 |
| 2,338,913 | Esposito | Jan. 11, 1944 |
| 2,342,966 | Paulson | Feb. 29, 1944 |

FOREIGN PATENTS

| Number | Country | Date |
|---|---|---|
| 516,902 | Germany | Jan. 29, 1931 |